(12) United States Patent (10) Patent No.: US 8,862,623 B2
Ishizuka (45) Date of Patent: Oct. 14, 2014

(54) COMMUNICATION TERMINAL AND SEARCH METHOD USING COMMUNICATION TERMINAL

(75) Inventor: Yuka Ishizuka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/121,632

(22) PCT Filed: Sep. 28, 2009

(86) PCT No.: PCT/JP2009/066721
§ 371 (c)(1),
(2), (4) Date: Mar. 29, 2011

(87) PCT Pub. No.: WO2010/035817
PCT Pub. Date: Apr. 1, 2010

(65) Prior Publication Data
US 2011/0179076 A1      Jul. 21, 2011

(30) Foreign Application Priority Data

Sep. 29, 2008 (JP) .................................. 2008-249630
Aug. 5, 2009 (JP) .................................. 2009-182299

(51) Int. Cl.
*G06F 17/30* (2006.01)
*H04L 29/08* (2006.01)

(52) U.S. Cl.
CPC .......... *G06F 17/30867* (2013.01); *H04L 67/04* (2013.01); *H04L 67/02* (2013.01)
USPC .......................................... 707/781; 707/769

(58) Field of Classification Search
USPC ............................. 707/769, 781, 783; 463/23
See application file for complete search history.

(56) References Cited

U.S. PATENT DOCUMENTS

2005/0149343 A1* 7/2005 Rhoads et al. ..................... 705/1
2008/0052126 A1* 2/2008 Sasai et al. ........................ 705/3
2009/0131152 A1* 5/2009 Busse .............................. 463/23

FOREIGN PATENT DOCUMENTS

JP      2002-015223      1/2002
JP      2003-271552      9/2003
JP      2008-118668      5/2008

OTHER PUBLICATIONS

Machine translated Japanese Patent Application Publication No. 2008118668 by Oyabu Koki et al.; May 22, 2008; 26 pages.*
Toyokazu Murakami, "Murakami Shisho no Hiden Honto ni Yakudatsu Soft Sinan Dai 22 Kai", Yomiuri PC, Oct. 1, 2005, vol. 10, No. 10, 103-107.
Takashi Hara, "Yugai Joho o Shadan suru Riyo Seigen Soft", Nikkei Personal Computing, Mar. 29, 2004, No. 454, 42.

* cited by examiner

*Primary Examiner* — Monica Pyo

(57) ABSTRACT

A communication terminal provides at least two modes of operation. When a first mode (child mode) is selected, predetermined functions such as search queries are restricted. In a second (normal, adult mode), a search query is transmitted from the communication terminal to an external search server that returns results of the search query to the communication terminal for display. In the first mode, the search query is not transmitted to the external search server. Instead, information associated with the search query is extracted from dictionary data that is stored in a memory within the communication terminal. The extracted data is displayed on the communication terminal as the search result. The dictionary data may include general terms and information that is biographic, geographic, pictorial, encyclopedic, etc., that is installed as an initial setting or is later downloaded with administrative permission.

11 Claims, 12 Drawing Sheets

| Search category | Keyword 1 | Condition 1 | Keyword 2 | Condition 2 | Keyword 3 | Condition 3 |
|---|---|---|---|---|---|---|
| Learning | Learning | or | Study | or | ... | ... |
| Visit | Visit | or | Sightseeing | or | ... | ... |
| Experiential learning | Experiential learning | or | Participation | or | ... | ... |
| Book | Book | or | Textbook | or | Picture book | ... |
| School | School | or | Cram school | or | ... | ... |
| History | History | or | Founder | or | ... | ... |
| Person | Person | or | Human | and | People | ... |

510  520  530  540  550  560  570

COMMUNICATION TERMINAL AND SEARCH METHOD USING COMMUNICATION TERMINAL

TECHNICAL FIELD

The present invention relates to a communication terminal and a search method by a communication terminal.

BACKGROUND ART

Conventionally, as a technique for restricting access to so-called harmful sites (Web pages), a communication terminal has been proposed in which access to sites on the Internet is limited to only bookmarks that have been registered by a person with parental authority (see Patent Document 1, for example).

Additionally, a method has been proposed in which a slave machine is allowed to access sites only via a master machine and transmission of information from the site to the slave machine is restricted by the master machine side (see Patent Document 2, for example).

PRIOR ART DOCUMENT

Patent Document

Patent Document 1: Japanese Published Unexamined Application No. 2008-118668
Patent Document 2: Japanese Published Unexamined Application No. 2003-271552

SUMMARY OF THE INVENTION

However, although the communication terminal according to Patent Document 1 can suppress access to a harmful site by limiting sites that can be accessed by a user of the communication terminal to only sites that have been bookmarked and registered by a person with parental authority, there has been a problem that the intention and purpose in the search, etc., of the user of the communication terminal (for example, a child) are not reflected.

Additionally, although the method according to Patent Document 2 can suppress the browsing of information from a harmful site by restricting, at the master machine side, information from the site to be transmitted to the slave machine, there has been a problem that the master machine is required to confirm the content of the information and restrict the transmission of predetermined information every time the slave machine requests the transmission of information of the site.

To solve the abovementioned problems, the communication terminal of the present invention comprises a mode setting section, a storing section, a search request accepting section, a communication section, a mode determining section, and a search execution section. The mode setting section sets a first mode or a second mode. The storing section stores at least one dictionary data. The search request accepting section accepts a search request based on a search query that includes one or a plurality of character strings. In response to accepting the search request by the search request accepting section, the communication section transmits the search query to an external search server and receives a search result from the search server. The mode determining section determines the mode that has been set by the mode setting section. In the case in which the mode determining section determines that it has been set to the first mode, the search execution section extracts one or a plurality of information corresponding to the search query as a search result from the dictionary data that is stored in the storing section. On the other hand, in the case in which the mode determining section determines that it is set to the second mode, the search execution section causes the communication section to transmit the search query to the search server.

Additionally, in a search method by a communication terminal that is communicable with an external search server, it is determined whether the set mode is the first mode or the second mode. Additionally, in the search method, a search request by the search query that includes one or a plurality of character strings is accepted.

Additionally, in the search method, in the case of being determined to have been set to the first mode, one or a plurality of information corresponding to the search query is extracted as a search result from the dictionary data that is stored in the communication terminal. Additionally, in the search method, in the case of being determined to have been set to the second mode, the accepted search query is transmitted to the search server and a search result based on the transmitted search query is received from the search server. According to the abovementioned communication terminal and search method, in the case of having been set to a predetermined mode, information corresponding to the search query from the dictionary data is stored in the storing section, enabling the search by the search server to be suppressed.

BRIEF DESCRIPTION OF DRAWINGS

FIG. 10 is a search category classification table 500 stored in a second character string storing section 141 according to the second embodiment.

EMBODIMENTS FOR CARRYING OUT THE INVENTION

First Embodiment

First, the first embodiment of the present invention is described below.

<Overview of Search System S>

Figure 1:
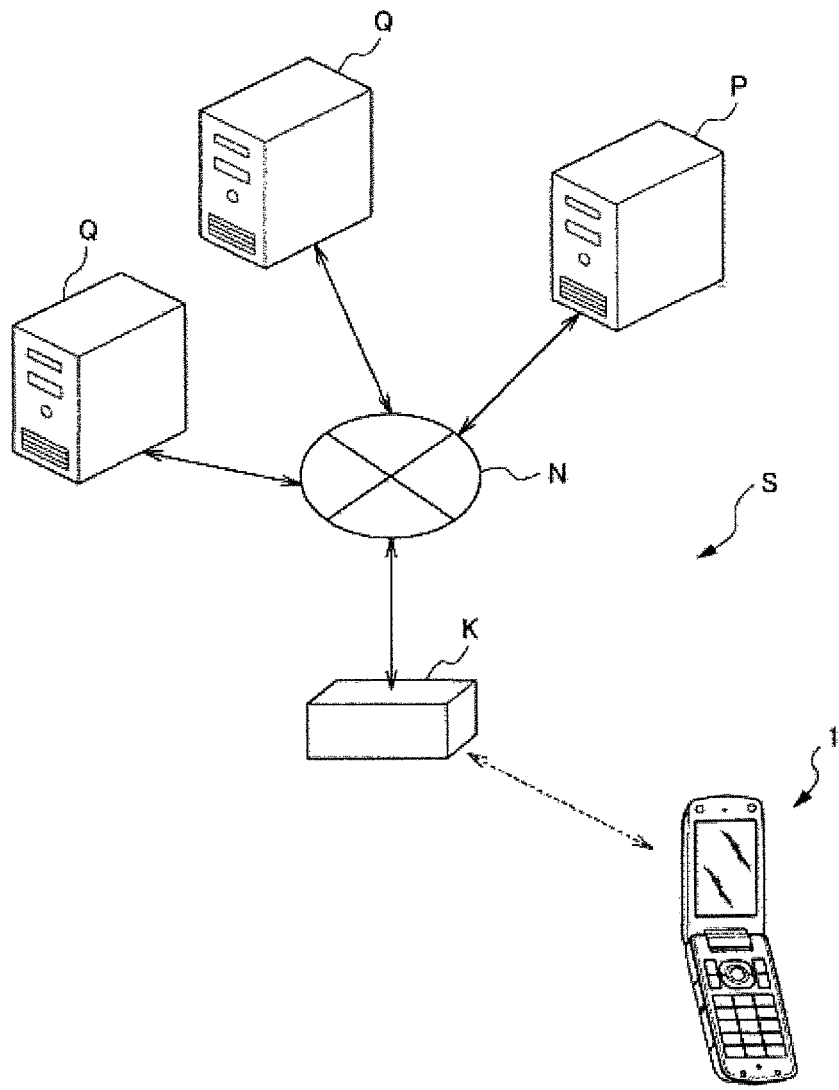
FIG. 1 is a diagram describing the overview of the search system S that includes the mobile phone 1 according to the first embodiment.

FIG. 1 is a diagram describing the overview of a search system S that includes a mobile phone 1 as a communication terminal. The search system S comprises as shown in FIG. 1, a search server P, an information providing server Q, a communication network N, a base station K that constitutes the communication network N, and a mobile phone 1. The search server P comprises a predetermined search engine or constitutes a predetermined search engine. The search server P is communicably connected to the mobile phone 1 via the communication network N. The search server P receives a predetermined search query (search keyword, search formula) from the mobile phone 1 via the communication network N and transmits search result information that is searched based on the received search query to the mobile phone 1 via the communication network N.

The information providing server Q provides information to the mobile phone 1 via the communication network N. Specifically, the information providing server Q provides information of a predetermined Web site or a Web page to the mobile phone 1 via the communication network N in response to an acquisition request from the mobile phone 1. The communication network N comprises a plurality of base stations K (not shown) that comprises the base station K in FIG. 1.

The mobile phone 1 is able to access to the search server P or the information providing server Q via the communication network N. Specifically, the mobile phone 1 is able to transmit a predetermined search query to the search server P via the communication network N and is able to receive search result information from the search server P. Additionally, the mobile phone 1 is able to access a predetermined information providing server Q based on search result information received from the search server P and is able to receive information, etc. in a predetermined Web page.

Additionally, the mobile phone 1 is able to select a child mode as the first mode and an adult mode (normal mode) as the second mode. In the case in which the child mode is selected, predetermined functions are restricted in the mobile phone 1 and the mobile phone 1 performs an extraction processing of a search query or information associated with a character string that constitutes a search query from a first dictionary 121 and a second dictionary 122 as dictionary data that are stored in a memory 44 (described below) in the mobile phone 1, does not transmit a search query in which the content is an input character string to the search server P. The constitution of the mobile phone 1 is explained in detail below.

<Appearance Constitution of the Mobile Phone 1>

Figure 2:
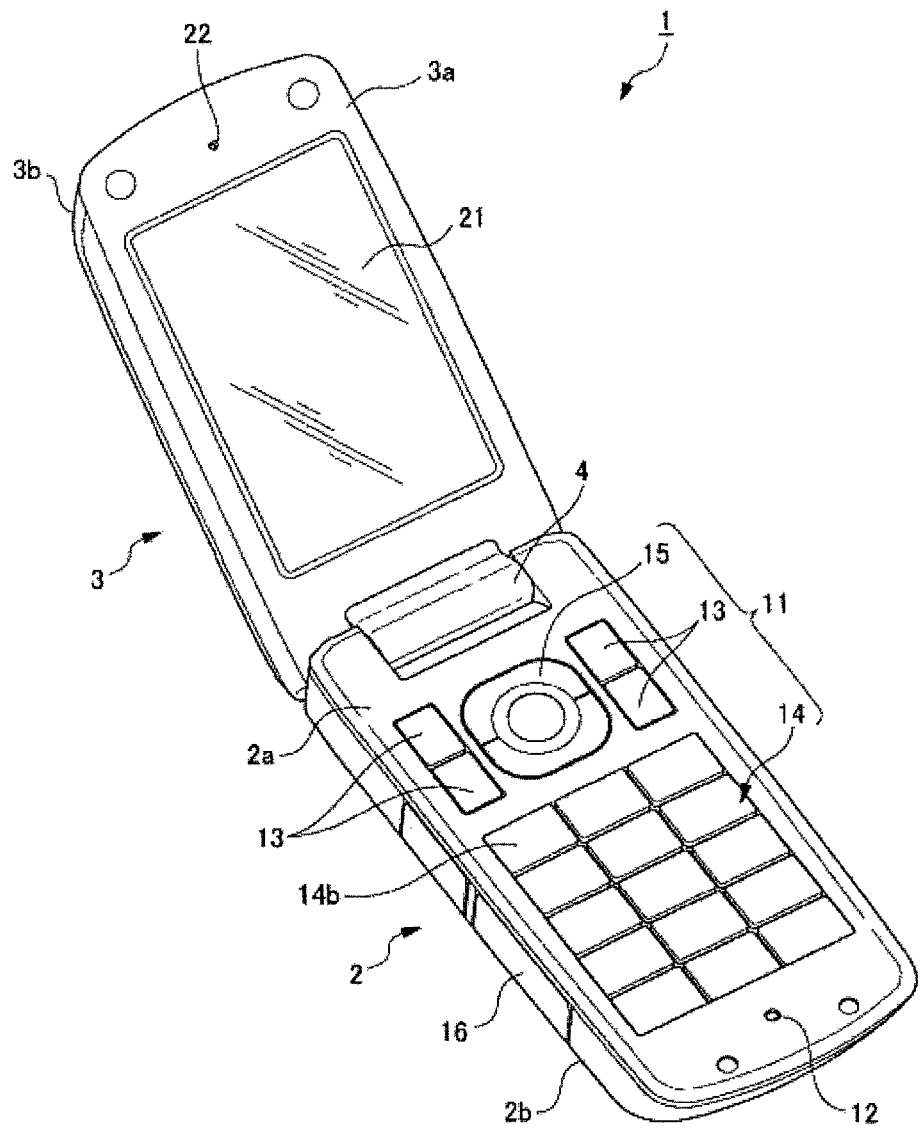
FIG. 2 is an external perspective view in the state in which the mobile phone 1 according to the first embodiment is opened.

FIG. 2 shows an external perspective view in the state of opening the mobile phone 1.

As shown in FIG. 2, the mobile phone 1 comprises an operation section side housing 2 and a display section side housing 3 as housings. The operation section side housing 2 and the display section side housing 3 are coupled so as to be able to be opened and closed via a coupling section 4 that comprises a hinge mechanism. Specifically, an upper end section of the operation section side housing 2 and a lower end section of the display section side housing 3 are coupled via the coupling section 4. Accordingly, the mobile phone 1 is able to relatively move the operation section side housing 2 and the display section side housing 3, which are coupled via the hinge mechanism. That is, the mobile phone 1 can be in a state in which the operation section side housing 2 and the display section side housing 3 are opened (opened state) and a state in which the operation section side housing 2 and the display section side housing 3 are folded (closed state). Here, the closed state refers to the state in which both housings are arranged so as to be overlapped with each other, and the opened state refers to the state in which both housings are arranged so as not to be overlapped with each other.

The outside of the operation section side housing 2 is a front case 2a and a rear case 2b. On the front case 2a side in the operation section side housing 2, an operation key group 11 as an input means and a microphone 12 in which a voice generated by a user of the mobile phone 1 during calling are exposed, respectively.

The operation key group 11 comprises a function setting operation key 13 for activating a variety of functions such as a variety of setting, an address book function, and an e-mail function; an input operation key 14 for inputting numbers for a phone number and characters for e-mail, etc.; and a decision operation key 15 as an operation member for making a decision in a variety of operations and a scroll in the up, down, left, and right directions, etc. Each of keys that constitute the operation key group 11 is assigned with a predetermined function (key assignment) in accordance with the opened or closed state of the operation section side housing 2 and the display section side housing 3, a type of mode, and a type of an application, etc. that is activated. Then, a user presses each key and an operation in accordance with the function assigned to each key is executed.

The microphone 12 is arranged on an outer end side that is opposed to the coupling section 4 side in a longitudinal direction of the operation section side housing 2. That is, the microphone 12 is arranged on one outer end side during the open state of the mobile phone 1.

An interface (not shown) for communicating with an external device (for example, a host device) is arranged on the side surface of one side in the operation section side housing 2. A side key to which a predetermined function is assigned and an interface (not shown) with which an external memory is inserted and removed are arranged on the side surface of the other side in the operation section side housing 2. The interface is covered by a cap. Each interface is covered by a cap when not in use.

An outside of the display section side housing 3 comprises a front case 3a and a rear case 3d. A display section 21 for displaying a variety of information and a speaker 22 as a receiver for outputting the voice of the counterpart in a call are arranged so as to be exposed on the front case 3b in the display section side housing 3. Here, the display section 21 comprises a liquid crystal panel, a drive circuit for driving the liquid crystal panel, and a light source section such as a back light for irradiating a light from the back side of the liquid crystal panel.

<Circuit Constitution of the Mobile Phone 1>

Figure 3:
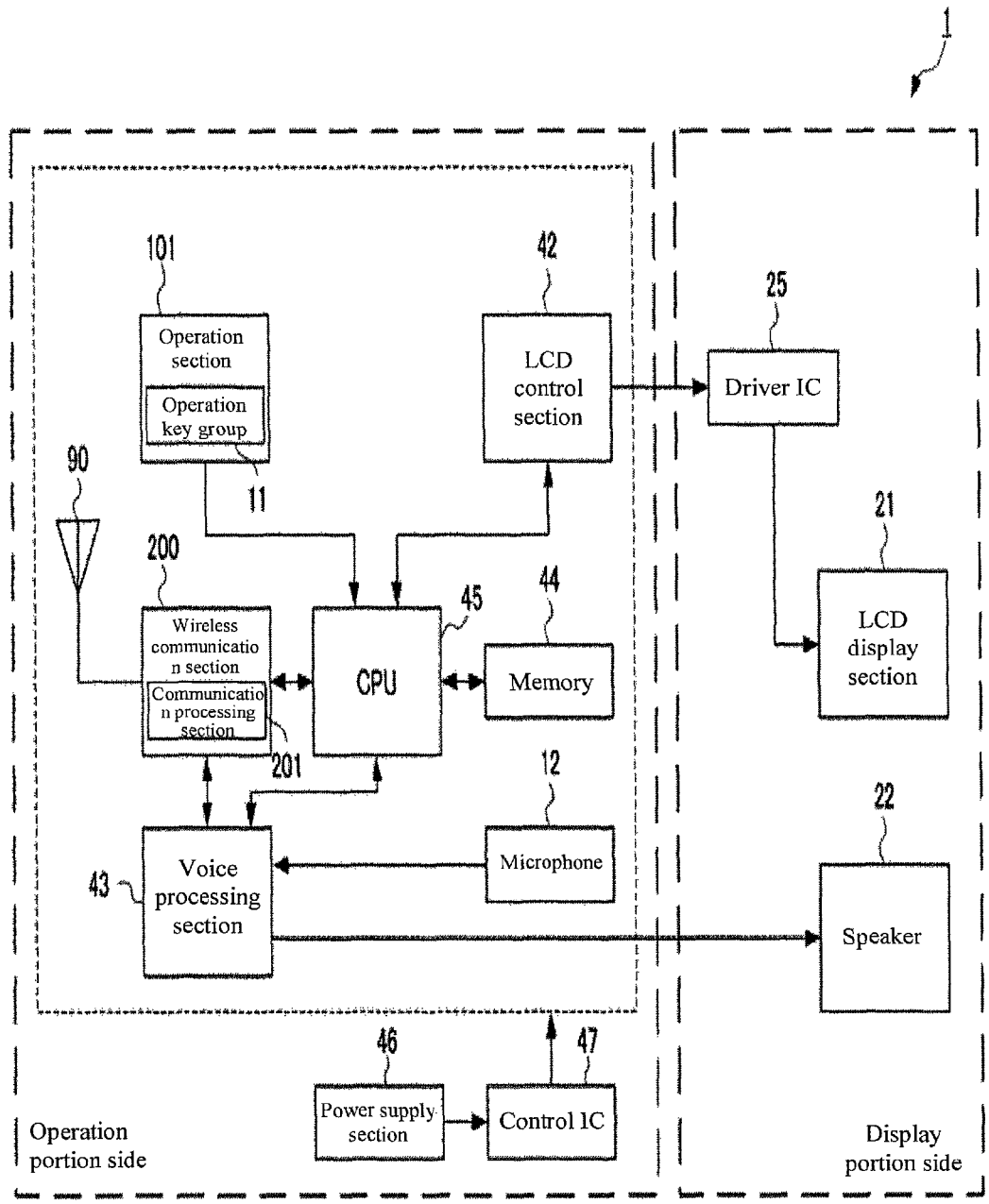
FIG. 3 is a block diagram describing the circuit constitution in the mobile phone 1 according to the first embodiment.

FIG. 3 is a block diagram describing a circuit constitution in the mobile phone 1. As shown in FIG. 3, the mobile phone 1 comprises a wireless communication section 200 that is arranged in the operation section side housing 2, an operation section 101 as an input section, the microphone 12, an LCD control section 42, a voice processing section 43, the memory 44 as a storing section, a CPU 45, a power supply section 46, a control IC 47, the display section 21 that is arranged on the display section side housing 3, the speaker 22, and a driver IC 25.

The wireless communication section 200 comprises an antenna section 90 for communicating with an external device at a predetermined frequency band used and a communication processing section 201 for performing a signal processing such as a modulation processing or a demodulation processing.

The antenna section 90 communicates with the base station K at the predetermined frequency band used (for example, 800 MHz). The antenna section 90 communicates with the search server P and the information providing server Q via the communication network N comprising the base station K at the predetermined frequency band used. Specifically, the antenna section 90 transmits a signal that comprises information of a modulated search query to the search server P via the communication network N and receives a signal that comprises information of a search result. Additionally, the antenna section 90 transmits a signal that comprises information of a modulated reception request to the information providing server Q via the communication network N and receives a signal that comprises information of a provided Web page. In this embodiment, although the predetermined frequency band used is assumed to be 800 MHz, it may be other frequency bands. Additionally, the antenna section 90 may be a so-called dual band compatible that can compatible with a second frequency band used (for example, 2 GHz) in addition to the predetermined frequency band used (a first frequency band used) or may be a multiband compatible that can further compatible with a third frequency band used.

The communication processing section 201 modulates a signal that is supplied from a predetermined functional section and transmits it to the base station K via the antenna section 90, and demodulates a signal that is received by the antenna section 90 and supplies it to the predetermined functional section. Specifically, the communication processing section 201 modulates a signal that comprises information of a search query supplied from the CPU 45, etc., transmits it to the base station K via the antenna section 90, and demodulates a signal that is received by the antenna section 90 and comprises search result information from the search server P and supplies it to the CPU 45, etc. Additionally, the communication processing section 201 modulates a signal that comprises information of a reception request supplied from the CPU 45, etc. and transmits it to the base station K via the antenna section 90, and demodulates a signal that is received by the antenna section 90 and comprises information of a Web page from the information providing server Q and supplies it to the CPU 45, etc.

The operation section 101 comprises the operation key group 11. The operation section 101 is able to input a character string that constitutes a search query. Here, a character string constituting a search query is characters that are one or a plurality of symbols, numbers, alphabet letters, hiragana letters, katakana letters, Chinese letters, or foreign language letters. Additionally, the operation section 101 is able to input a character string that constitutes a search query as well as symbols ("and" and "or") regarding a search condition. Here, in this embodiment, a search query in which a plurality of character strings are listed with a space is a search query for requesting a search of information that comprises all of the character strings.

The LCD controlling section 42 performs a predetermined image processing on an input image data and outputs an image processed image data to the driver IC 25 in accordance with the control of the CPU 45. The driver IC 25 saves image data that is input from the LCD control section 42 in a frame memory and outputs the image data that is saved in the frame memory to the display section 21 at a predetermined timing.

The display section 21 displays predetermined characters and images based on the data that is input form the driver IC 25. The display section 21 is able to display a search screen 21A (see FIG. 5), a first search result screen 21B (see FIG. 6), or a second search result screen 21C (see FIG. 7). About the search screen 21A, the first search result screen 21B, and the second search result screen 21C (see FIG. 7) will be described in detail below.

The memory 44 stores predetermined data. Specifically, the memory 44 comprises an application program for operating a variety of functions, profile information that comprises age information, the first dictionary 121, and the second dictionary 122 (see FIG. 4). The first dictionary 121 and the second dictionary 122 will be described in detail below.

The CPU 45 controls the entire of the mobile phone 1. The CPU 45, in particular, performs predetermined controls for the wireless communication section 200, the LCD control section 42, and the voice processing section 43. Additionally, the CPU 45 comprises a mode setting section 105, a mode determining section 106, a search request accepting section 107, a search execution section 108, and a Web information acquisition section 109 as functional sections, which are described below. The functional section in the CPU 45 will be described in detail below.

The voice processing section 43 performs a predetermined voice processing on a signal that is supplied from the communication processing section 201 and outputs the voice processed signal to the speaker 22, in accordance with the control of the CPU 45. The speaker 22 externally emits (outputs) a voice based on a signal that is supplied from the voice processing section 43. Additionally, the voice processing section 43 performs a predetermined processing on a signal that is input from the microphone 12 and output the processed signal to the communication processing section 201, in accordance with the control of the CPU 45. The communication processing section 201 performs a predetermined process on a signal that is input from the voice processing section 43 and outputs the processed signal to the antenna section 90.

The power supplying section 46 comprises a battery 80. The battery 80 is a lithium-ion battery comprising a predetermined capacity. The control IC 47 converts a power supply voltage that is supplied from the power supply section 46 into a predetermined power supply voltage, and supplies the converted power supply voltage to each section in the mobile phone 1 (for example, CPU 45, etc.).

<Constitution of the Functional Sections in the Mobile Phone 1>

Figure 4:
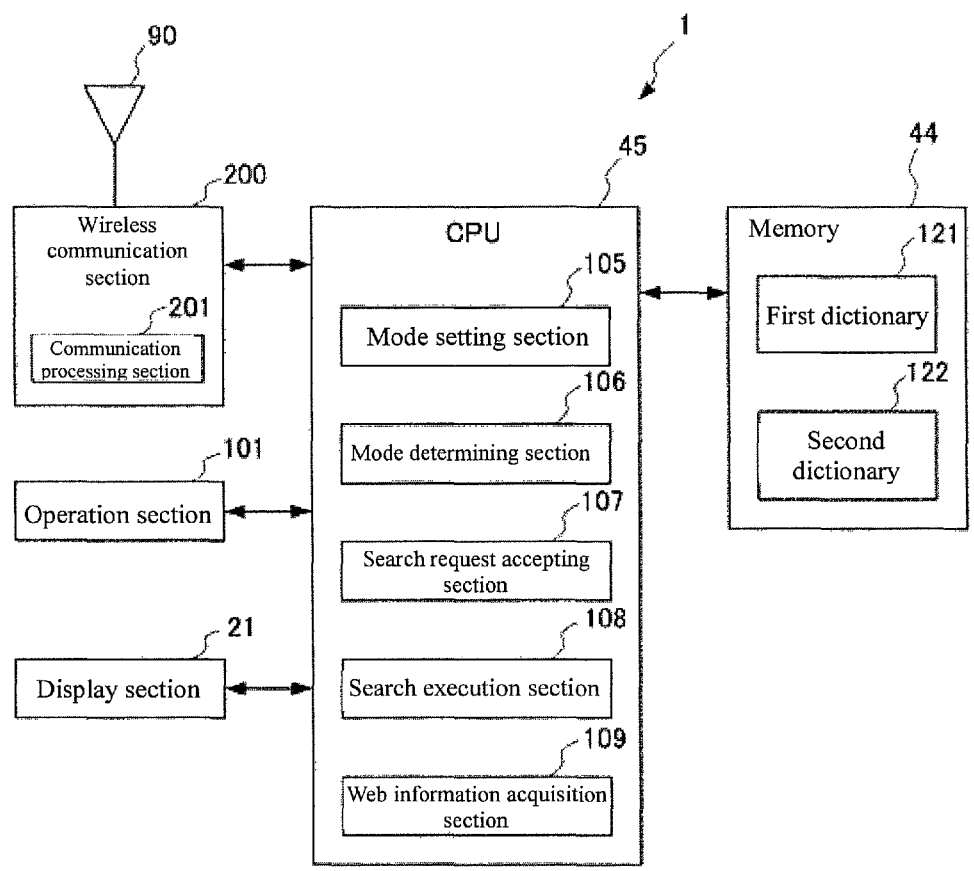
FIG. 4 is a block diagram describing the constitution of the functional section in the mobile phone 1 according to first embodiment.
Figure 5:
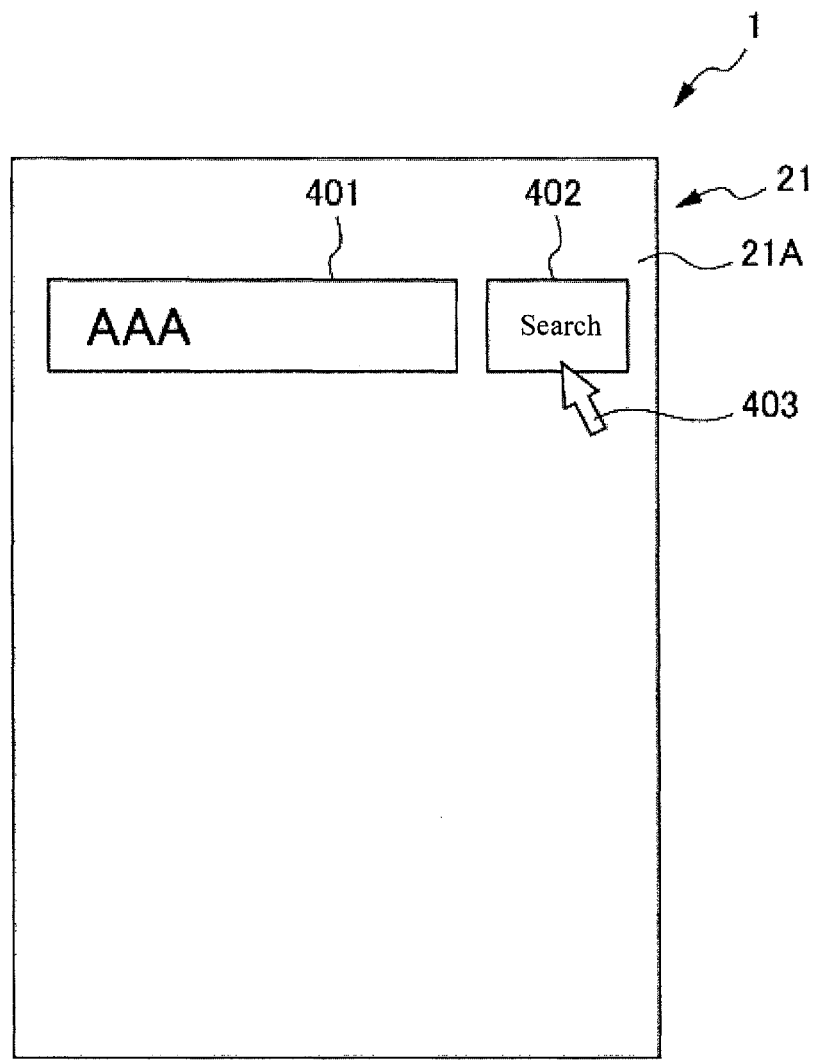
FIG. 5 is a diagram showing the search screen 201A according to the first embodiment.
Figure 6:
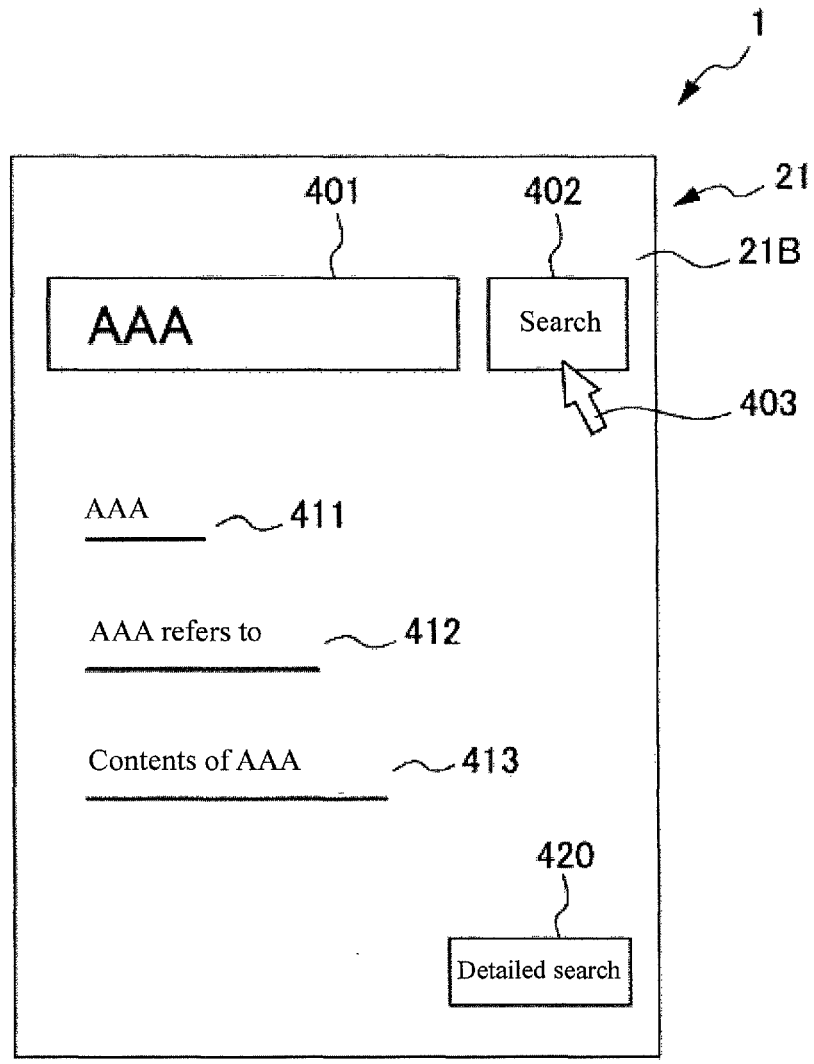
FIG. 6 is a diagram showing the first search result screen 201B according to the first embodiment.
Figure 7:
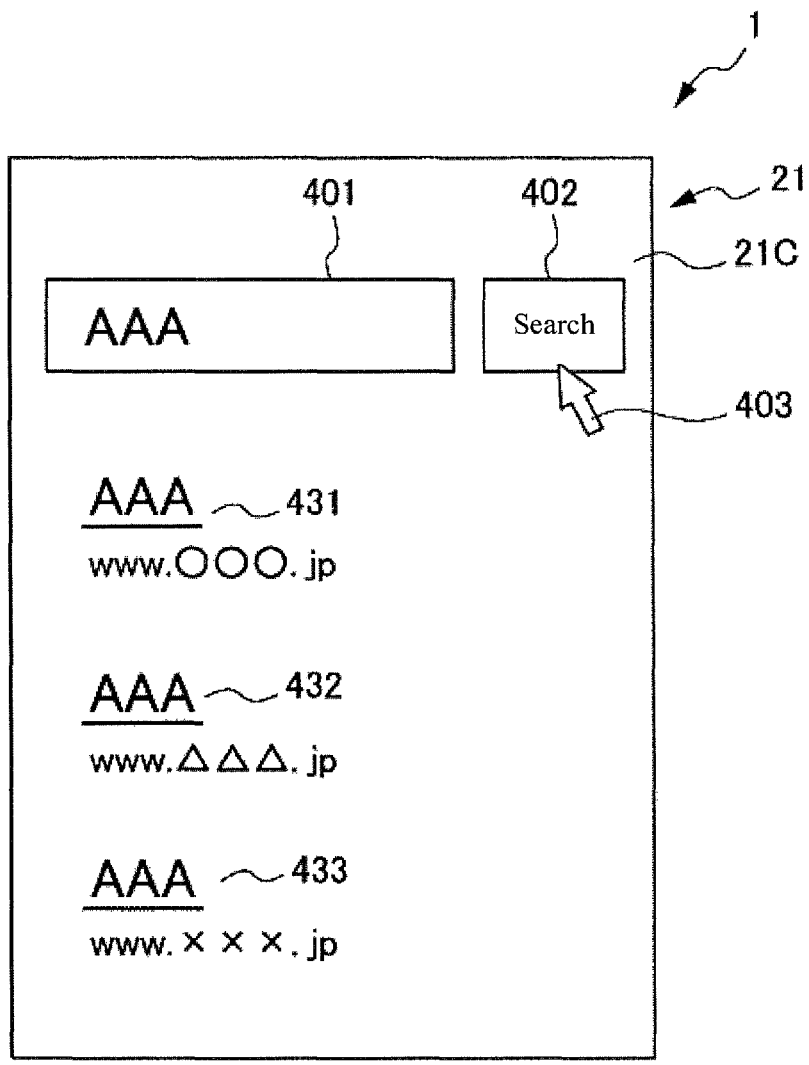
FIG. 7 is a diagram showing the second search result screen 201C according to the first embodiment.

FIG. 4 is a block diagram describing a constitution of the functional sections in the mobile phone 1. FIG. 5 is a diagram showing the search screen 201A. FIG. 6 is a diagram showing the first search result screen 201B. FIG. 7 is a diagram showing the second search result screen 201C.

As shown in FIG. 4, the mobile phone 1 comprises: the wireless communication section 200 as a communication section; the operation section 101; the mode setting section 105, the mode determining section 106, the search request accepting section 107, the search execution section 108, and the Web information acquisition section 109 which are included in the CPU 45 as functional sections; the first dictionary 121 and the second dictionary 122 which are included in the memory 44; and the display section 21.

The memory 44 comprises the first dictionary 121 and the second dictionary 122. Each of the first dictionary 121 and the second dictionary 122 are dictionary data that are approved to be used by the input of a password by an administrator (for example, a parent) of the mobile phone 1 Each of the first dictionary 121 and the second dictionary 122 may be installed in the mobile phone 1 as an initial setting or may be the one that is externally downloaded via the Internet, etc. Here, the administrator may input a predetermined password and approve in the external downloading.

Each of the first dictionary 121 and the second dictionary 122 may be not only a general term dictionary but also data of a biographic and a geographic dictionary, a pictorial book comprising image information, and a so-called encyclopedia.

The mode setting section 105 can set a mode of the mobile phone 1 to a child mode as a first mode or to an adult mode (normal mode) as a second mode. The mode setting section 105 may be able to set to the child mode or the adult mode and does not require a procedure for selecting either one of these two modes. For example, the mode setting section 105 may comprise a means of switching to the other mode in the state in which one mode is set. In this embodiment, the initial mode is the adult mode (normal mode) and the mode setting section 105 provides a means of switching to the child mode.

The mode setting section 105 can be made to be in an automatic setting state. In the case of the automatic setting state, the mode setting section 105 can set (switch) the mode automatically based on age information that is stored in the memory 44.

In the case in which the mode setting section 105 is in a manual setting state, it may require the input of a predetermined password in order to switch the mode. Additionally, assuming that the mode setting section 105 will be in the automatic setting state, it may require the input of a predetermined password in order to change age information. Accordingly, a mode change against the will of the administrator (mode setting person) can be suppressed.

The mode determining section 106 determines whether the mode that is set by the mode setting section 105 is the child mode or the adult mode. The predetermined functions are limited in accordance with the mode that is determined by the mode determining section 106. Additionally, operations of the search execution section 108 are treated differently in accordance with the mode that is determined by the mode determining section 106.

The search request accepting section 107 accepts a search request based on a search query in which the content is a character string that is input by the operation section 101. Specifically, by pointing a cursor 403 to a search button 402 and selecting it by a predetermined operation after pointing a cursor to an input box 401 and inputting a character string, the search request accepting section 107 accepts a search request by a search query in which the content is a character string that is input to the input box 401 (see FIG. 5).

The search execution section 108 can cause the wireless communication section 200 to transmit a search query to the search server P (see FIG. 1) and is able to extract corresponding information from the first dictionary 121 and the second dictionary which are stored in the memory 44. Specifically, in the case in which the mode determining section 106 determines that it has been set to the adult mode by the mode setting section 105, the search execution section 108 causes the wireless communication section 200 to transmit a search query to the search server P. On the other hand, in the case in which the mode determining section 106 determines that it has been set to the child mode by the mode setting section 105, the search execution section 108 does not cause the wireless communication section 200 to transmit a search query to the search server P and extracts information corresponding information from the first dictionary 121 and the second dictionary 122 which are stored in the memory 44.

Additionally, in the child mode, in the case in which a search request as the same search query or as a search query which is a character string that constitutes the same search query is accepted by the search request accepting section 107 after extracting information corresponding to the search query from the first dictionary 121 and the second dictionary 122, the search execution section 108 can cause the wireless communication section 200 to transmit the search query to the search server P.

Specifically, in the case in which one or a plurality of information can be extracted from the first dictionary 121 and the second dictionary 122, the search execution section 108 can cause the wireless communication section 200 to transmit the same search query or a search query regarding to a character string that constitutes the same search query to the search server P, and in the case in which one or a plurality of information cannot be extracted because there is no information corresponding to the search query in the first dictionary 121 and the second dictionary 122, the search execution section 108 can cause the wireless communication section 200 not to transmit the same query or a search query regarding to a character string that constitutes the same search query to the search server P. That is, essentially, in the case of having been set to the child mode, an external search in which the search query is transmitted to the search server P is not performed, but in the case in which information corresponding to the search query, etc. can be extracted from the first dictionary 121 and the second dictionary 122, permitted by an administrator, the external search may be permitted.

In the adult mode, the search result from the search server P that is received via the wireless communication section 200 is saved in the memory 44 and link information is listed on the display section 21 (described below) (see FIG. 7). In the child mode, in the case in which one or a plurality of information is extracted from the first dictionary 121 and the second dictionary 122, the one or the plurality of information is listed on the display section 21 as a search result (see FIG. 6). In this case, as described above, a detailed search (external search) by the same search query, etc. can be performed successively. The search result in this detailed search (external search) is displayed in the same manner as that of the search result in the adult mode (see FIG. 7). Additionally, in the child mode, in the case in which information is not extracted from the first dictionary 121 and the second dictionary 122, what indicates that there is no appropriate information on the display section 21 is displayed.

The Web information acquisition section 109 request predetermined information to the information providing server Q via the wireless communication section 200 and acquires information from the information providing server Q via the wireless communication section 200. Then, the Web information acquisition section 109 causes the display section 21 to display the acquired Web information in a predetermined display manner.

The display section 21 is able to display a search result from the search server P, a search result of information that is extracted from the first dictionary 121 and the second dictionary 122, etc., a Web page that is provided from the information providing server Q, and content of extracted information that is included in the first dictionary 121 and the second dictionary 122. Additionally, the display section 21 is able to display the search screen 21A (see FIG. 5), the first search result screen 21B (see FIG. 6), or the second search result screen 21C (see FIG. 7).

As shown in FIG. 5, the search screen 21A comprises the input box 401 and the search button 402. The input box 401 displays a character string that is input by the operation section 101 to create a search query. The search button 402 is able to instruct a search with a search query comprising content that is the character string displayed in the input box 401. Specifically, when the cursor 403 is moved so as to be overlapped on the search button 402 and a predetermined operation in the operation section 101 (pressing down in the display section 21) is performed, the search request accepting section 107 is instructed to accept the search. When a search request is accepted by the search request accepting section 107, the search execution section 108 causes the wireless communication section 200 to transmit a search query to the search server P or extracts information corresponding to the search query from the first dictionary 121 and the second dictionary 122. Here, the search button 402 is in an (initial) search screen in both the adult mode and the child mode.

As shown in FIG. 6, the first search result screen 21B lists and displays link information of information extracted from the first dictionary 121 and the second dictionary 122 in the child mode. Specifically, the first search result screen 21B lists and displays link information 411, 412, 413 of information extracted from the first dictionary 121 and the second dictionary 122. Here, when the cursor 403 is moved so as to be overlapped on the link information 411, 412, 413 and a predetermined operation in the operation section 101 (pressing down in the display section 21) is performed, the content of link origin information that is the extracted information is displayed on the display section 21.

Additionally, the first search result screen 21B further comprises a detailed search button 420. In the child mode, in the case in which information is extracted from the first dictionary 121 and the second dictionary 122, the detailed search button 420 is a button for further requesting an external search as the same search query or as the search query which is a character string that constitutes the same search query (a search request to the search server P). Here, when the cursor 403 is moved so as to be overlapped on the detailed search button 420 and a predetermined operation in the operation section 101 (pressing down in the display section 21) is performed, the search request accepting section 107 is instructed to accept the search. Then, when a search request is accepted by the search request accepting section 107, the search execution section 108 causes the wireless communication section 200 to transmit a search query to the search server P. Here, the detailed search button 420 may be displayed only in the case in which information is extracted from the first dictionary 121 and the second dictionary 122.

As shown in FIG. 7, the second search result screen 21C displays a result of a detailed search (external search) in the adult mode and the child mode. Specifically, the second search result screen 21C displays search result information that is received from the search server P. The second search result screen 21C lists and displays the link information 431, 432, 433. Here, when the cursor 403 is moved so as to be overlapped on the link information 431, 432, 433 and a predetermined operation in the operation section 101 (pressing down in the display section 21) is performed, the Web information acquisition section 109 requests the output of information to the predetermined information providing server Q based on the link information and acquires the output information. Then, the information acquired by the Web information acquisition section 109 is displayed on display section 21. Here, the second search result screen 21C is a screen that displays a result of a detailed search in the adult mode and the child mode. As described above, the operation section 101 is able to input a character string that constitutes a search query. Additionally, the operation section 101 is able to move the cursor 403 that is displayed on the display section 21. A user can input a character string by the operation section 101 while viewing the input box 401 in the display section 21 (see FIG. 6). Additionally, the user can execute (request) a search by the search button 402 while viewing the content in the input box 401 in the display section 21 (see FIG. 6). Additionally, the user can consider whether a further detailed search is required while viewing a search result in the display section 21 and execute (request) detailed searches successively in the case in which a detailed search is required (see FIG. 7).

<Operation of the Mobile Phone 1 in Searching>

Figure 8:
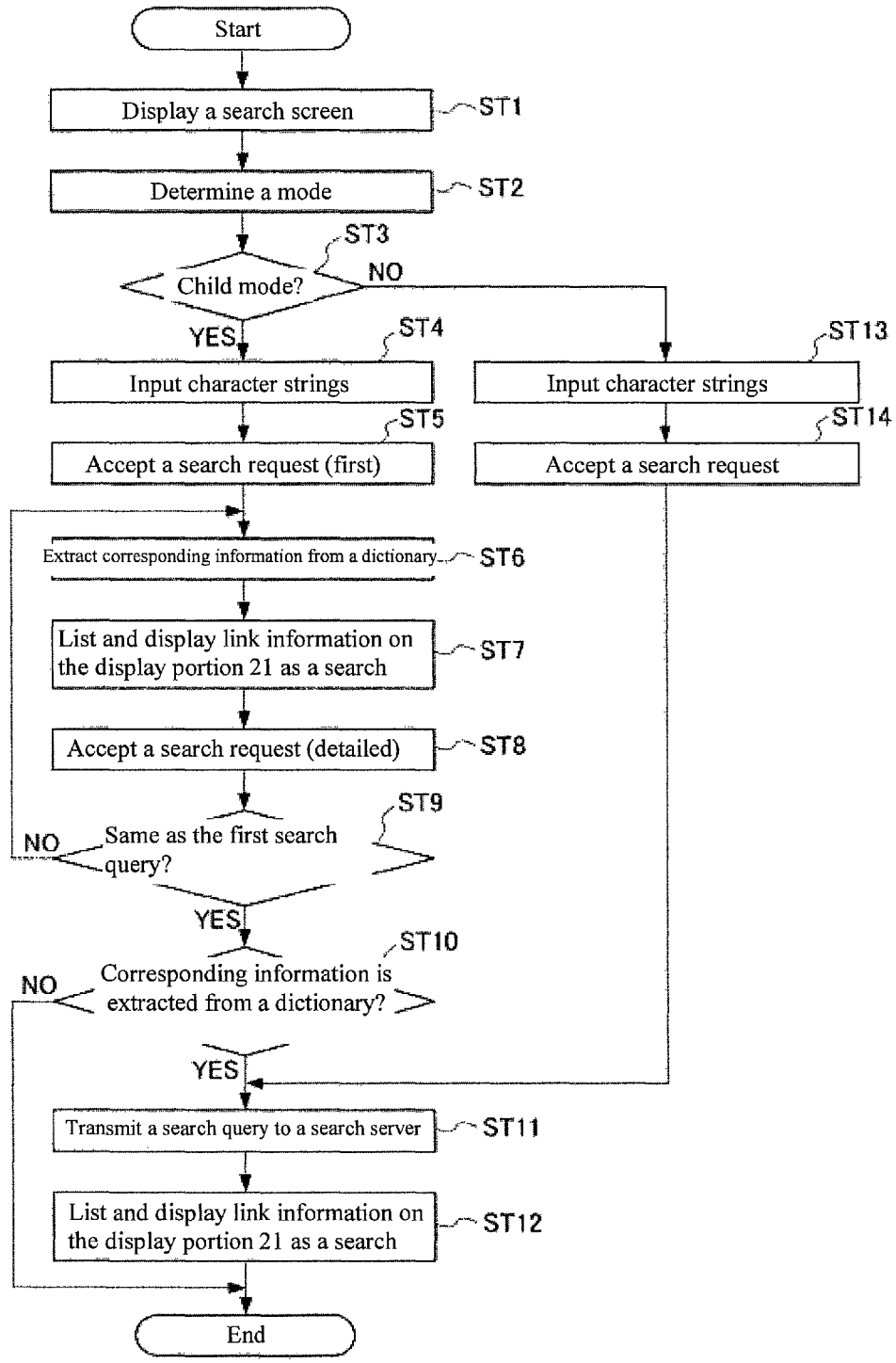
FIG. 8 is a flow diagram describing the operation of the mobile phone 1 according to the first embodiment.

FIG. 8 is a flow diagram describing an operation of the mobile phone 1. As shown in FIG. 8, first, a user causes the display section 21 to display a search screen by a predetermined operation in the operation section 101 (ST1). When the search screen is displayed on the display section 21, the mode determining section 106 determines a mode that is set by the mode setting section 105 (ST2). In the case in which the mode determining section 106 determines that it is set to the child mode (ST3, YES), the search screen 21A shown in FIG. 5 is displayed on the display section 21. The user points the cursor 403 to the input box 401 so as to be able to input a character string and inputs a character string that constitutes a search query while viewing the input box 401 (ST4). Then, the user points the cursor 403 to the search button 402 and performs a predetermined operation by the operation section 101 in order to request a search. Accordingly, the search request accepting section 107 accepts a first search request by a search query in which the content is a character string that is displayed in the input box 401 (ST5).

In the case in which the search request is accepted by the search request accepting section 107, the search execution section 108 extracts corresponding information from the first dictionary 121 and the second dictionary 122 (ST6). As a result, as shown in FIG. 6, link information of the extracted information is listed and displayed on the display section 21 (ST7). Here, in the case in which information is not extracted by the search execution section 108 because there is no corresponding information in the first dictionary 121 and the second dictionary 122, etc., a display is made accordingly on the display section 21.

Further, the user points the cursor 403 to the detailed search button 420 and performs a predetermined operation by the operation section 101 while viewing the first search result screen 21B shown in FIG. 6. Accordingly, the search request accepting section 107 accepts a detailed search request by a search query in which the content is a character string that is displayed in the input box 401 (ST8). In the case in which the search query in the detailed search request is the same as the search query in the first search request (ST9, YES), it proceeds to step ST10. Then, in the case in which the search query in the detailed search is not the same as the search query in the first search request (ST9, NO), it returns to step ST6, and the search execution section 108 extracts predetermined information from the first dictionary 121 and the second dictionary 122 based on a different search query.

In step ST10, in the case in which predetermined information is extracted from the first dictionary 121 and the second dictionary 122 in a first search (ST10, YES), the search execution section 108 causes the wireless communication section 200 to transmit the same search query to the search server P (ST11). The search result from the search server P is listed and displayed on the display section 21, as shown in FIG. 7 (ST12).

Additionally, in step ST10, in the case in which predetermined information is not extracted from the first dictionary 121 and the second dictionary 122 in the first search (ST10, NO), the search execution section 108 causes the wireless communication section 200 not to transmit the same search query to the search server P and terminates the process. Accordingly, in the child mode, it can suppress an external search of information that is not included in the dictionary that is permitted by the administrator to be used.

Additionally, in step ST3, in the case in which the mode determining section 106 determines that it is not set to the child mode (ST3, NO), the search screen 21A shown FIG. 5 is displayed on the display section 21 in the same manner as the case of being determined that it is in the child mode. Here, the case of being determined that it is not set to the child mode refers to the case that the mode determining section 106 determines that it is in the adult mode (normal mode).

The user points the cursor 403 to the input box 401 so as to be able to input a character string and inputs a character string that constitutes a search query while viewing the input box (ST13).

Then, the user points the cursor 403 to the search button 402 and performs a predetermined operation by the operation section 101 in order to request a search. Accordingly, the search request accepting section 107 accepts an external search request by a search query in which the content is a character string that is displayed in the input box 401 (ST14).

Accordingly, the search execution section 108 causes the wireless communication section 200 to transmit the search query to the search server P (ST11). The search result from the search server P is listed and displayed on the display section 21, as shown in FIG. 7 (ST12).

Effects of this Embodiment

According to this embodiment, in the case of having been set to the child mode, the search execution section 108 extracts information corresponding to the search query from the first dictionary 121 and the second dictionary 122 that are stored in the mobile phone 1; hence, it suppresses a child who is a user from accessing the external search server P without permission. Accordingly, the mobile phone 1 that is capable of avoiding the access to harmful Web sites can be provided.

Additionally, according to this embodiment, even in the case of having been set to the child mode, it performs the search request by the same operation as that of in the adult mode (normal mode) and a search result is displayed on the same search result screen. Accordingly, the mobile phone 1 can extract information corresponding to a search query from the first dictionary 121 and the second dictionary 122 stored therein while displaying as if it has performed the external search by the search server P in the child mode and display the search result.

Additionally, according to this embodiment, the first dictionary 121 and the second dictionary 122 that are used for an internal search are permitted to be used by the administrator; hence, the displayed search result or extracted information will be secure content for the administrator. Additionally, the registration of a dictionary that is used for the internal search requires the input of a predetermined password; hence the displayed search result and the extracted information will represent more secure content for the administrator. Additionally, the administrator (parent) can ascertain the range of information that is browsed by a child without frequently checking the information that is browsed by the child.

Additionally, according to this embodiment, in the case of having been set to the child mode, the search execution section 108, in the first search, extracts corresponding information from the first dictionary 121 and the second dictionary 122 that are stored in the mobile phone 1, but in the case in which the user is a child, it will frequently be satisfied by the information extracted from the dictionary (for example, description of a term, etc.); hence, the search is often terminated by the satisfaction in the first search. That is it can satisfy the search request of the child who is a user and provide the mobile phone 1 in which the access to an external Web site, etc. is suppressed. Additionally, according to this embodiment, the search screen 21A is common to the child mode and the adult mode (normal mode) and the search result screens 21B, 21C also have the same display manner that are displayed in a list. Accordingly, even in the child mode, the search operation is performed by the same operation and display screen as those when in the adult mode (normal mode); hence, it has high persuasion properties from the viewpoint of the child who is a user.

The Second Embodiment

Although the constitution of the mobile phone 1 according to the second embodiment is approximately the same as that of the first embodiment, the functional section is different from that of the first embodiment. Additionally, the operations of the mobile phone 1 at the time of the search are also different. Therefore, the constitution of the functional section of the mobile phone 1 according to the second embodiment is described first, and then the operation of the mobile phone 1 during the search is described below.

<Constitution of the Functional Section in the Mobile Phone 1>

Figure 9:
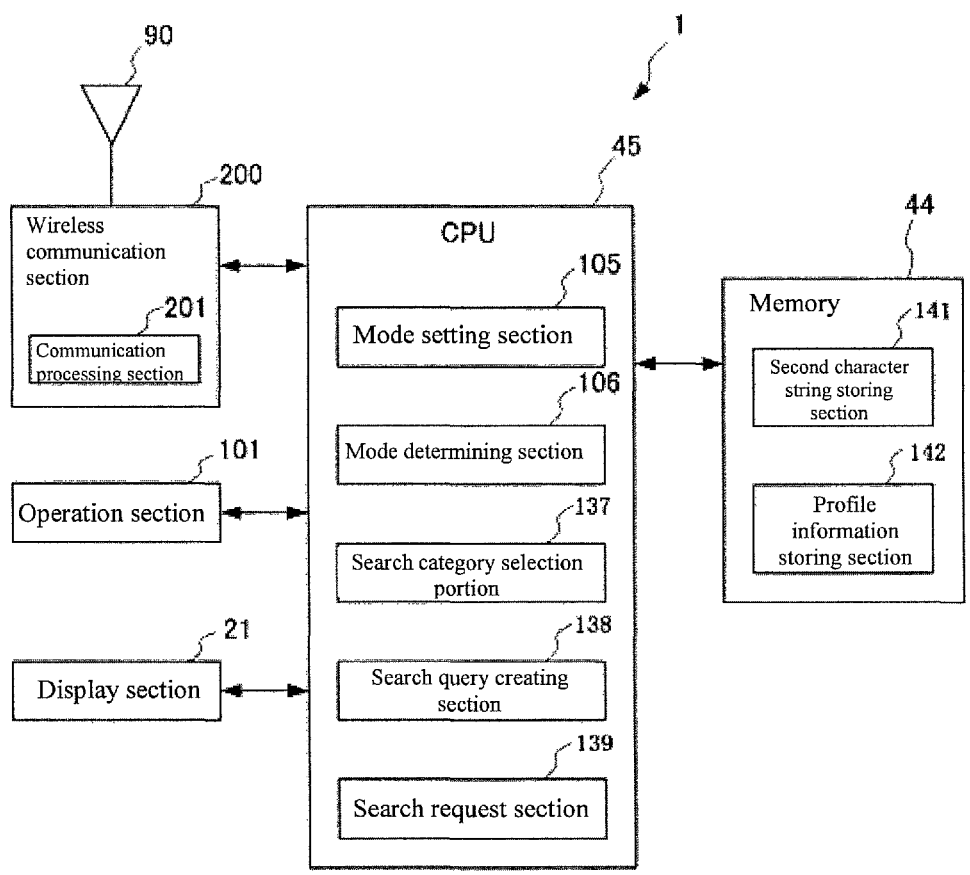
FIG. 9 is a block diagram describing the constitution of the functional section in the mobile phone 1 according to the second embodiment.
Figure 11:
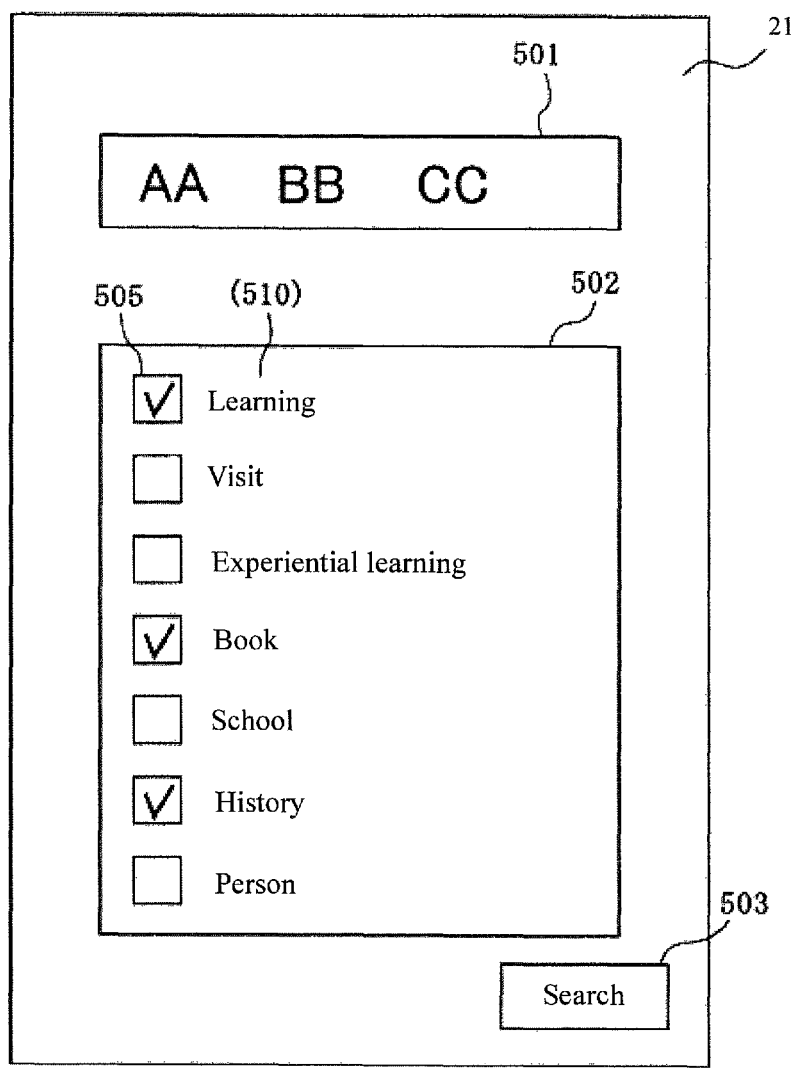
FIG. 11 is a diagram showing the display section 21 in the case in which a search screen according to the second embodiment is displayed.

FIG. 9 is a block diagram describing the constitution of the functional section in the mobile phone 1. FIG. 10 shows the search category classification table 500 that is stored in the second character string storing section 141. FIG. 11 is a diagram showing the display section 21 in the case in which a search screen is displayed.

As shown in FIG. 9, the mobile phone 1 comprises: the wireless communication section 200; the operation section 101; the mode setting section 105, the mode determining section 106, the search category selection section 137, the search query creating section 138, and the search request section 139 which are included in the CPU 45 as functional sections; the second character string storing section 141 and the profile information storing section 142 included in the memory 44 as functional sections; and the display section 21.

The memory 44 comprises the second character string storing section 141 and the profile information storing section 142. The second character string storing section 141 stores a second character string that is added as a part of a search query in the case of having been set to the child mode. Specifically, the second character string storing section 141 stores one or more second character strings that are added to the first character string in the case in which the mode determining section 106 (described below) determines that it is set to the child mode. Furthermore, the second character string storing section 141 classifies and stores a plurality of the second character strings that are added to the first character string for each search category.

Specifically, as shown in FIG. 10, the second character string storing section 141 comprises the search category classification table 500. The search category classification table 500 comprises: a search category name field 510 that shows content of a search category; a keyword 1 field 520, a keyword 2 field 540, and a keyword 3 field 560 which are associated with the search category; and a condition 1 field 530, a condition 2 field 550, and a condition 3 field 570 which show a search condition between each of keywords. Here, the keyword 1 field 520, the keyword 2 field 540, and the keyword 3 field 560 are the second character strings that are added to the first character string in the child mode. The condition 1 field 530, the condition 2 field 550, and the condition 3 field 570 are search conditions between each of the abovementioned keywords (second character strings). Here, in the case in which the range of "and" is not clear, the range can be made clear using other symbols, etc. The search query creating section 138 (described below) refers to the search category classification table 500 and creates a search query in the child mode.

The search category classification table 500 comprises keywords (second character strings) and search conditions for guiding a search result to a predetermined category (purpose of the search or a directionality of the search) in the case of performing the search using the first character string, which is input by a user, as a search query.

Additionally, it may be able to add, modify, or delete a search category or a keyword in the search category classification table 500. Accordingly, the setting of a search category and the guidance of a search result can be performed in accordance with the age of the user, etc. Additionally, it enables more accurate guidance to a healthy Web site, accordingly.

Here, in the case in which a search category or a keyword in the search category classification table 500 is added, modified, or deleted, the input of a password may be requested. Accordingly, it can prevent the user from adding, modifying, or deleting the content of a search category or a keyword without permission. For example, it can prevent a child who is a user from adding, modifying, or deleting the content of a search category or a keyword without permission as long as getting approval that is the input of a password from a parent who is the administrator.

The profile information storing section 142 stores profile information that comprises age information of the user. The age information that is stored in the profile information storing section 142 is referred in the case in which the mode setting section 105 is in the automatic setting state (described below).

The mode setting section 105 can set a mode of the mobile phone 1 to a child mode as a first mode or to an adult mode (normal mode) as a second mode. The mode setting section 105 may be able to set to the child mode or the adult mode and does not require a procedure for selecting either one of these two modes. For example, the mode setting section 105 may have a means of switching to the other mode in the state in which one mode is set. In this embodiment, the initial mode is the adult mode (normal mode) and the mode setting section 105 provides a means of switch to the child mode.

The mode setting section 105 can be made to be in an automatic setting state. In the case of the automatic setting state, the mode setting section 105 can set (switch) the mode automatically based on age information that is stored in the profile information storing section 142.

In the case in which the mode setting section 105 is in a manual setting state, it may require the input of a predetermined password in order to switch the mode. Additionally, assuming that the mode setting section 105 will be in the automatic setting state, it may require the input of a predetermined password in order to change profile information. Accordingly, a mode change against the will of the administrator (mode setting person) can be suppressed.

The mode determining section 106 determines whether the mode that is set by the mode setting section 105 is the child mode or not. In the case in which the mode determining section 106 determines that it is set to the child mode, the predetermined functions are limited and content in which the second character string is added to the first character string that is input by the operation section 101 is transmitted to the search server P (see FIG. 1) as a search query.

The search category selection section 137 is able to select a predetermined search category from a plurality of search categories. The search category is of, for example, specifying a purpose of the search and a directionality of the search. The search category can comprise, for example, Learning, Visit, Experiential learning, Book, School, History, Person, as shown in FIG. 10. Additionally, as shown in FIG. 10, a plurality of keywords (the second character strings) are corresponded to each of the plurality of the search categories.

Here, in the case in which the mode determining section 106 determines that it is set to the child mode, the second character string that is added to the first character string that is input by the operation section 101 is a keyword corresponding to the selected search category. For example, in the case in which the search category selection section 137 selects a search category "Learning" shown in FIG. 10, the second character string such as keywords "Learning", "Study", etc. that are corresponded to "Learning" is added to the first character string.

Additionally, the search category selection section 137 is able to select a plurality of search categories (see FIG. 11). In this case, keywords that are corresponded to each of the search categories are added to the first character string.

Additionally, the search category selection section 137 is able to select the search category only in the case of the child mode. Specifically, in the case of the child mode, the search category selection box 502 shown in FIG. 11 is displayed. In other words, in the case of the adult mode (normal mode), the search category selection section 137 cannot select the search category. That is, in the case of the adult mode (normal mode), the search category selection box 502 shown in FIG. 11 is not displayed.

Additionally, in the case in which any search categories are not selected by the search category selection section 137, the search request section 139 (described below) may not perform a search request. Here, in the case of having been set to the child mode, a predetermined search category is selected by the search category selection section 137 as an initial setting.

The search query creating section 138 creates a search query that is transmitted to the search server (see FIG. 1) via the wireless communication section 200. Specifically, in the case in which the mode determining section 106 determines that it is in the child mode, the search query creating section 138 creates a search query comprising content that is the first character string that is input by the operation section 101 that a plurality of a second character strings that are stored in the second character string storing section 141 are added to. Additionally, in the case in which the mode determining section 106 determines that it is in the adult mode (normal mode), the search query creating section 138 creates a search query in which the content is the first character string that is input by the operation section 101.

In the case in which, for example, "Learning" is selected as the search category, the search query creating section 138, in the child mode, creates a search query by adding content "and (Learning or Studying or . . . )" to the first character string. Additionally, in the case in which, for example, "Person" is selected as the search category, the search query creating section 138, in the child mode, creates a search query by adding the content "and (Person or (Human and People) . . . )" to the first character string.

Additionally, as shown in FIG. 11, in the case in which the search query creating section 137 selects three categories of "Learning", "Book", and "History", the search query creating section 138, in the child mode, creates a search query in which the content is the first character string and ((Learning or Study or . . . ) or (Book or Textbook or Picture book or . . . ) or (History or Founder or . . . )).

The search request section 139 causes the wireless communication section 200 to transmit (output) a search request, comprising a search query created by the search query creating section 138, to the search server P. In the case in which the search category selection section 137 does not select any search categories, the search request section 139 determines whether or not performing a search request to the search server P in accordance with the mode that is determined by the mode determining section 106. Specifically, In the case in which the search category selection section 137 does not select any search categories, when the mode determining section 106 determines that it is in the child mode, the search request section 139 causes the wireless communication section 200 not to output a search request to the search server P, and when the mode determining section 106 determines that it is in the adult mode (normal mode), the search request section 139 causes the wireless communication section 200 to output a search request to the search server P.

The display section 21 is able to display a search screen, a search result from the search server P, or a Web page that is provided from the information providing server Q. For example, the display section 21 is able to display a search screen on which an input box 501 and a search category selection box 502 are displayed, as shown in FIG. 11. The input box 501 displays the first character string that is input by the operation section 101. Additionally, in the search category selection box 502, check boxes 505 and the names of a search category are displayed. The names of a search category, which is displayed in the search category selection box 502, are the same as the names that are listed in the search category name field 510 shown in FIG. 10.

The operation section 101 is able to input a first character string that constitutes a search query. Additionally, the operation section 101 is able to select a search category. A user can input the first character string by the operation section 101 while viewing the input box 501 in the display section 21 (see FIG. 11). Additionally, the user can select a search category by the operation section 101 while viewing the search category selection box 502 in the display section 21 (see FIG. 11).

<Operation of the Mobile Phone 1 in Searching>

Figure 12:
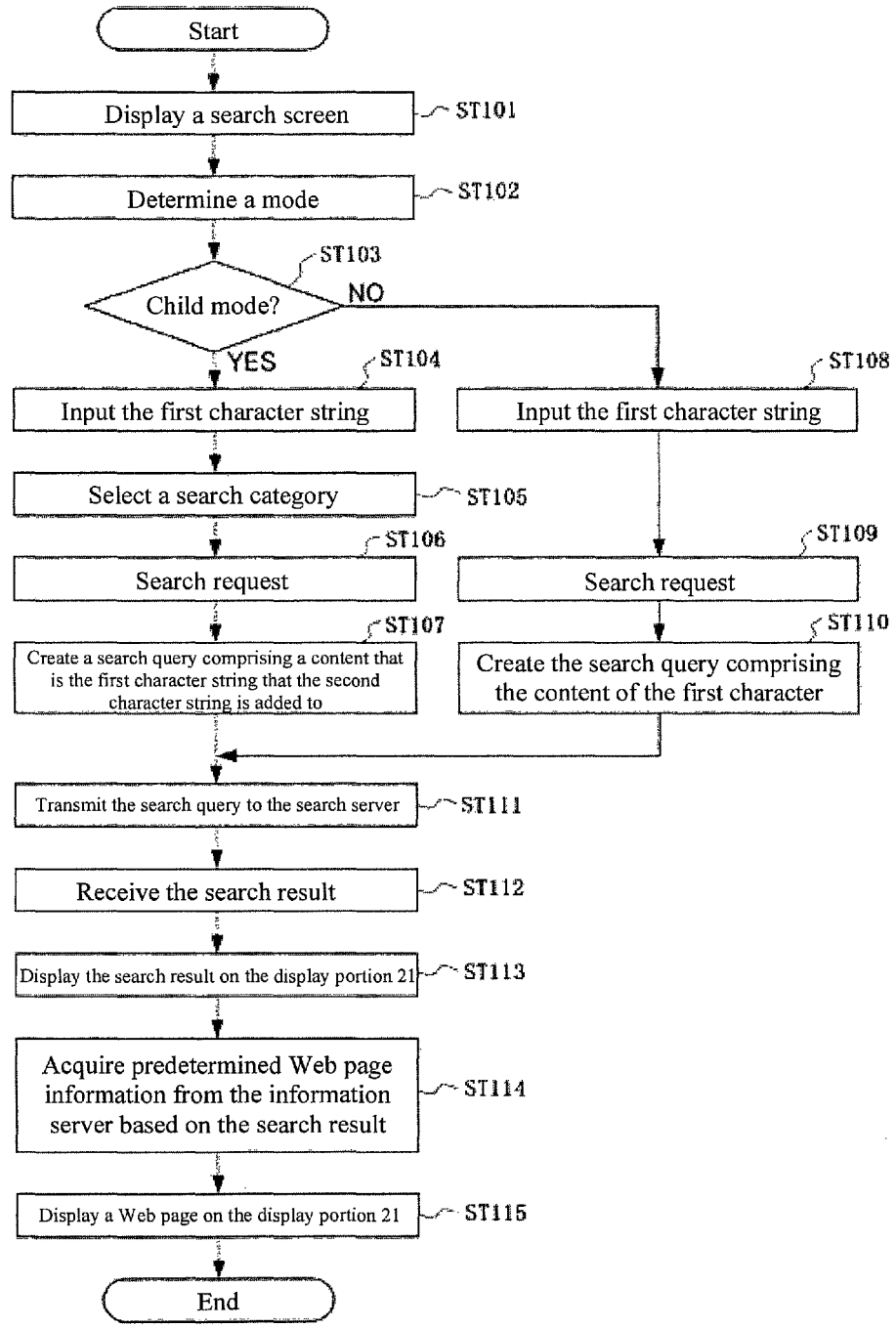
FIG. 12 is a flow diagram describing the operation of the mobile phone 1 according to the second embodiment.

FIG. 12 is a flow diagram describing an operation of the mobile phone 1. As shown in FIG. 12, first, a user causes the display section 21 to display a search screen by a predetermined operation in the operation section 101 (ST101). When the search screen is displayed on the display section 21, the mode determining section 106 determines a mode that is set by the mode setting section 105 (ST102). In the case in which the mode determining section 106 determines that it is set to the child mode (ST103, YES), the search screen, which comprises the input box 501 and the search category selection box 502 shown in FIG. 11, is displayed on the display section 21.

The user points a cursor (not shown) to the input box 501 so as to be able to input character strings and inputs the first character strings that constitute a search query while viewing the input box (ST104).

Then, the user points the cursor (not shown) to the predetermined check box 505 in the search category selection box 502 and checks (puts a check mark in) the check box by a predetermined operation in the operation section 101 to select a predetermined search category (ST105).

Then, the user points the cursor (not shown) to the search button section 503 to perform a predetermined operation by the operation section 101 in order to request a search (ST106). Accordingly, the search query creating section 138 creates a search query comprising content that is the first character string that is input by the operation section 101 that a second character string that is stored in the second character string storing section 141 is added to (ST107).

Then, the search request section 139 transmits the search query, which is created in the search query creating section 138, to the search server P and requests a search by the transmitted search query (ST111).

The search server P performs a search based on the search query and transmits search result information to the mobile phone 1. The mobile phone 1 receives search result information via the communication section 200 (ST112). Here, the second character string is added to the search query that is transmitted to the search server P and the search result that will be received comprises content that is guided to a predetermined search category. That is, the search result is guided to the search category and comprises content of a less harmful Web page (site).

A user causes the display section 21 to display the search result (ST113). Additionally, the user requests predetermined Web page information to the information providing server Q via the communication section 200 based on the search result. The information providing server Q transmits the requested Web page information to the mobile phone 1. The mobile phone 1 receives (acquires) the Web page information via the communication section 200 (ST114). Then, the user causes the display section 21 to display the acquired predetermined Web page (ST115). Additionally, in the case in which the mode determining section 106 determines that it is in the adult mode (normal mode) (ST103, NO), a search screen that comprises the input box 501 and does not comprise the search category selection box 502 is displayed on the display section 21. The user points the cursor (not shown) to the input box 501 so as to be able to input a character string and inputs a first character string that constitutes a search query while viewing the input box (ST108).

Then, the user points the cursor (not shown) to the search button section 503 and performs a predetermined operation by the operation section 101 in order to request a search (ST109). Accordingly, the search query creating section 138 creates a search query comprising content of the first character string that is input by the operation section 101 (ST110). That is, in the case in which the mode determining section 106 determines that it is in the adult mode (normal mode), the search query will comprise the content that is input by the user.

Effects of this Embodiment

According to this embodiment, the mobile phone 1 that is capable of avoiding the access to harmful Web sites without inhibiting the access to healthy Web sites by requesting a search to the search server P with a search query in which content is an input first character string that a predetermined second character string is added to can be provided.

Additionally, according to this embodiment, a search is not performed with a search query in which a predetermined keyword is eliminated in a plurality of keywords (first character strings) that are input by a user, but the search is performed with a search query comprising content that predetermined character strings (second character strings) are added to. Accordingly, a search result that meets the intention of the user can be obtained and a search result in which a fewer number of harmful sites are included can be obtained.

Additionally, according to this embodiment, a keyword (second character string) is corresponding to each of predetermined search categories (purposes of search); hence, a search result can be guided accurately.

Additionally, according to this embodiment, a search request is not transmitted to the search server P in the case in which a predetermined search category is not selected, in the child mode. Accordingly, the searching for the adult modes (normal mode) can be suppressed in the child mode. According to this embodiment, the input of a password is requested in the case in which a search category or a second character string that is stored in the second character string storing section 141 is added, modified, or deleted. Accordingly, it can suppress a child who is a user from adding, modifying, or deleting the second character string without permission of a parent who is an administrator, for example.

Other Embodiments

As above, the preferred embodiments has been described, however, the present invention is not limited to the abovementioned embodiments and can be implemented in various forms. For example, the abovementioned embodiments describe the mobile phone 1 as a communication terminal, but it is not limited thereto, and it may be PHS (registered trademark; Personal Handy phone System), PDA (Personal Digital Assistant), a portable navigation unit, a notebook computer, etc.

Additionally, although the abovementioned embodiments describe the mobile phone 1 that can be folded with the coupling section 4, it may not be such a folding type, but may be a slide type in which one of the housings of the operation section side housing 2 and the display section side housing 3 is slid in one direction from their overlapping state, a rotary (turning) type in which one of the housing of the operation section side housing 2 and the display section side housing 3 is rotated around the axis along the overlapping direction thereof, or a type (straight type) in which the housing of the operation section side housing 2 and the display section side housing 3 are arranged in one housing and there is no coupling section. Additionally, the mobile phone 1 may be a so-called two-axis hinge type that is openable and closable as well as rotatable.

Additionally, the search server P may comprise a Web server, a DB server, an application server if necessary, and it may be one server or separate servers, respectively.

Additionally, in the abovementioned embodiments, the mobile phone 1 has two modes of the child mode (first mode) and the adult mode (second mode, normal mode), but it is not limited thereto, and it may have three or more modes.

Additionally, in the abovementioned embodiments, the child mode is described as the first mode, but it is not limited thereto, and the first mode may be a user mode (the second mode is an administrator mode). Additionally, in the same way, the first mode may be an employee mode (the second mode is a company mode).

Additionally, in the abovementioned embodiments, the first dictionary 121 and the second dictionary 122 are permitted to be used, but it is not limited thereto, and only one of them may be permitted to be used. In this case, the search execution section 108 extracts information corresponding to a search query from only one of the permitted first dictionary 121 or second dictionary 122.

Additionally, in the abovementioned embodiments, in the case of having been set to the child mode, when an external search is performed using the external search server P after extracting predetermined information from the first dictionary 121, etc. that is stored in the mobile phone 1, a predetermined character string may be added to the search query or a filtering process to the search result under a predetermined condition may be performed so that a harmful site is not included in a search result.

Additionally, in the abovementioned embodiments, in the case of the child mode, first, it extracts information for the search query from the dictionary that is stored in the mobile phone 1 (wireless communication terminal), however, it may access to a predetermined dictionary site that is previously set and then extract information for the search query.

EXPLANATION OF REFERENCE DESIGNATORS

1—Mobile phone
2—Operation section side housing
3—Display section side housing
11—Operation key group
44—Memory
45—CPU
101—Operation section (input section)
105—Mode setting section
106—Mode determining section
107—Search request accepting section
108—Search execution section
121—First dictionary
122—Second dictionary
139—Search request section
141—Second character string storing section
200—Wireless communication section
N—Communication network
P—Search server
Q—Information providing server

The invention claimed is:
1. A search method by a communication terminal that is communicable with an external search server comprising:
determining whether a set mode is a first mode or a second mode;
accepting a search request comprising one or a plurality of first character strings;
when the communication terminal is set to the first mode,
selecting at least one search category of a predetermined plurality of search categories from a search category classification table that is stored in the communication terminal, wherein the search category classification table comprises and at least one keyword character string classified to each of the predetermined plurality of search categories;
creating a modified search request by combining the one or a plurality of first character strings and the at least one keyword character string associated with the selected at least one search category;
transmitting the modified search request to the external search server;
when the communication terminal is set to the second mode, transmitting the search request to the external search server;
receiving a search result from the external server based on the transmitted search request or the transmitted modified search request; and
presenting the search result on a user interface of the communication terminal.
2. A communication terminal comprising:
a memory for storing a search category classification table comprising a predetermined plurality of search categories, and at least one keyword character string classified to each of the predetermined plurality of search categories;
a processor configured for setting the communication terminal to a mode for operating the communication terminal, for accepting a search request having at least one search request character string, and for presenting a search result on a user interface of the communication terminal;

wherein, if the mode is a second mode, the processor transmits the search request to an external search server, receives the external search results from the external search server, and presents the external search results as the search result; and wherein, if the mode is a first mode, the processor selects at least one search category of the predetermined plurality of search categories of the search category classification table that is associated with the search request, extracts at least one keyword character string corresponding to the selected at least one search category from the search category classification table, creates a modified search query by combining the at least one search request character string and the extracted at least one keyword character string, transmits the modified search query to the external search server, receives the external search results from the external search server, and presents the external search results on the user interface as the search result.

3. The communication device of claim 2, wherein the user interface comprises at least one of a display for presenting the search result or a speaker for presenting the search result in an audio format.

4. The communication device of claim 2, wherein the first mode is a child mode, and wherein said second mode is an adult mode.

5. The communication device of claim 4, wherein the memory stores age information of a user, and wherein the processor automatically sets the mode based on the age information of the user.

6. The communication terminal according to claim 2, wherein the predetermined plurality of search categories comprises a first search category, and wherein if the mode is the first mode and the processor selects the first search category, and the processor extracts a plurality of keyword character strings classified to the first search category.

7. The communication terminal according to claim 2, wherein the search category classification table comprises at least one search condition string, and wherein the modified search query further comprises the at least one search condition string.

8. The communication terminal according to claim 2, wherein the selected at least one search category is selected by a user on the user interface.

9. A communication terminal comprising:
- a memory for storing a search category classification table comprising a predetermined plurality of search categories, and at least one keyword character string classified to each of the predetermined plurality of search categories;
- a user interface for inputting a search query of one or a plurality of first character strings;
- a processor comprising:
- a mode setting section for setting a mode comprising a first mode or a second mode;
- a search request accepting section for accepting the search query;
- a search category selection section that, when the mode is set to the first mode, selects any of the predetermined plurality of search categories of the search category classification table that are associated with the search query;
- a query creating section that, when the mode is set to the first mode, creates a modified search query by combining the one or a plurality of a first character strings, and the at least one keyword character string corresponding to the selected any of the predetermined plurality of search categories selected by the search category selection section; and
- an execution section that,
  - when the mode is set to the first mode, transmits the modified search query to an external search server,
  - when the mode is set to the second mode, transmits the search query to the external search server,
  - receives external search results from the external search server, and
  - presents the external search results on the user interface.

10. The communication terminal according to claim 9, wherein said first mode is a child mode, and wherein said second mode is an adult mode.

11. The communication terminal according to claim 10 wherein the memory stores age information of a user, and the mode setting section automatically sets the mode based on the age information.

* * * * *